(12) United States Patent (10) Patent No.: US 8,308,196 B2
Ivutin et al. (45) Date of Patent: Nov. 13, 2012

(54) LABEL SHEET

(75) Inventors: Dmitry Ivutin, Kanagawa (JP); Tsukasa Matsuda, Kanagawa (JP); Eizo Kurihara, Kanagawa (JP); Mario Fuse, Kanagawa (JP); Kunihiro Takahashi, Kanagawa (JP); Shoji Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 579 days.

(21) Appl. No.: 12/468,536

(22) Filed: May 19, 2009

(65) Prior Publication Data

US 2010/0117349 A1 May 13, 2010

(30) Foreign Application Priority Data

Nov. 11, 2008 (JP) ................................ 2008-288697

(51) Int. Cl.
*B42D 15/00* (2006.01)
(52) U.S. Cl. ........................................... 283/81; 283/67
(58) Field of Classification Search ............... 340/572.1; 283/67, 72, 81, 82, 83, 85, 94, 901
See application file for complete search history.

(56) References Cited

U.S. PATENT DOCUMENTS

| | | | | |
|---|---|---|---|---|
| 4,660,025 A * | 4/1987 | Humphrey | ................. | 340/572.2 |
| 5,921,583 A * | 7/1999 | Matsumoto et al. | ............ | 283/81 |
| 6,091,133 A * | 7/2000 | Corisis et al. | ................. | 257/666 |
| 6,556,139 B2 * | 4/2003 | Manov et al. | ............... | 340/572.6 |
| 6,747,559 B2 * | 6/2004 | Antonenco et al. | ........ | 340/572.1 |
| 7,561,047 B2 * | 7/2009 | Ogata et al. | ............... | 340/572.1 |
| 2005/0126685 A1 | 6/2005 | Boulay | | |
| 2007/0240809 A1 | 10/2007 | Boulay | | |
| 2008/0013212 A1 | 1/2008 | Fuse et al. | | |
| 2008/0018674 A1 | 1/2008 | Matsuda et al. | | |
| 2009/0078359 A1 * | 3/2009 | Boulay | .......................... | 156/152 |
| 2010/0006562 A1 * | 1/2010 | Clothier | ........................ | 219/494 |
| 2011/0070464 A1 | 3/2011 | Matsuda et al. | | |

FOREIGN PATENT DOCUMENTS

| | | |
|---|---|---|
| CN | 1659584 A | 8/2005 |
| CN | 101109913 A | 1/2008 |
| EP | 0 773 523 A1 | 5/1997 |
| JP | A-2001-192627 | 7/2001 |
| JP | A-2007-169837 | 7/2007 |

OTHER PUBLICATIONS

European Search Report issued on Jan. 11, 2010 in European Patent Application No. 09162967.5.
Chinese Patent Office, Notification of the First Office Action issued May 3, 2012 in Chinese Patent Application No. 200910147376.4 w/English-language Translation.

* cited by examiner

*Primary Examiner* — Casandra Davis
(74) *Attorney, Agent, or Firm* — Oliff & Berridge, PLC

(57) ABSTRACT

A label sheet, includes: a label base material; a release liner; an adhesive layer which is formed between the label base material and the release liner; and wires that are disposed between the label base material and the release liner so as to be respectively placed on lines coupling at least one of two pairs of opposed sides of the label base material in a manner that both ends of each of the wires respectively locate at positions away from the corresponding sides coupled by each of the lines by 0.2 mm or more.

5 Claims, 7 Drawing Sheets

LABEL SHEET

CROSS-REFERENCE TO RELATED APPLICATIONS

This application is based on and claims priority under 35 USC 119 from Japanese Patent Application No 2008-288697 filed Nov. 11, 2008.

BACKGROUND

1. Technical Field

The present invention relates to a label sheet.

2. Related Art

Label sheets are used for the usage of a wide range such as commercial use, business use or home use as labels, seals, stickers, emblems etc. There are various kinds of label sheets such as printing label sheets, label sheets for an inkjet printer, label sheets for an image forming apparatus of an electrophotography type such as label sheets for a laser printer. These various kinds of label sheets are respectively subjected to desired kinds of printings in accordance with the usages thereof and used. In general, each of these label sheets is configured by a label base material, a release liner and an adhesive layer formed between the label base material and the release liner, and is used in a manner, for example, that, after the desired printing is performed on the label base material by-the corresponding one of the various kinds of printings, the label base material is exfoliated from the release liner between the release liner and the adhesive layer and then the label base material is pasted on a subject to be pasted and is used.

Meanwhile, it is quite important to prevent forgery in a special document such as a paper money or a security. In order to prevent the forgery of such the special documents, the technique has been known in which metal fiber such as magnetic material detectable by a magnetic device is laid or buried within the special document.

Further, in recent years, due to the spread of computers and networks, it has become possible to easily extract information among enormous information and print and copy the extracted information. Thus, such a problem has been brought into the public eye that printed documents obtained by illegally printing or copying high security information are taken out and so secret information is leaked. Therefore, in order to prevent the leakage of secret information caused by that printed documents obtained by illegally printing or copying high security information are taken out, various kinds of apparatuses and methods have been proposed in which security as to information is enhanced.

For example, there has been known a method in which metal fiber such as magnetic material having large Barkhausen effect is contained within a sheet and a detecting device detects a pulse signal caused by the magnetic material by utilizing the large Barkhausen effect of the magnetic material to thereby confirm the presence of the sheet.

SUMMARY

According to an aspect of the invention, a label sheet, includes: a label base material; a release liner; an adhesive layer which is formed between the label base material and the release liner; and wires that are disposed between the label base material and the release liner so as to be respectively placed on lines coupling at least one of two pairs of opposed sides of the label base material in a manner that both ends of each of the wires respectively locate at positions away from the corresponding sides coupled by each of the lines by 0.2 mm or more.

BRIEF DESCRIPTION OF THE DRAWINGS

Exemplary embodiment(s) of the present invention will be described in detail based on the following figures, wherein.

DETAILED DESCRIPTION

An exemplary embodiment of the invention will be explained. The exemplary embodiment is an example for implementing the invention and so the invention is not limited to this exemplary embodiment.

Figure 1:
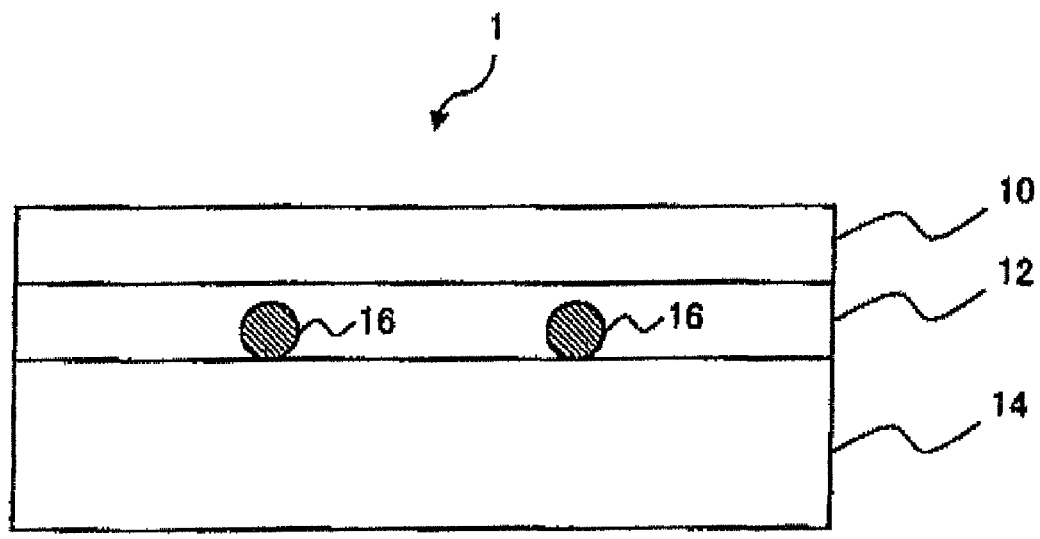
FIG. 1 is a schematic sectional diagram showing an example of the configuration of a label sheet according to an exemplary embodiment of the invention.

FIG. 1 is a schematic sectional diagram showing an example of the configuration of a label sheet according to the exemplary embodiment of the invention. The label sheet 1 includes a label base material 10, a release liner 14 and an adhesive layer 12 formed between the label base material 10 and the release liner 14, and at least one wire 16 is contained between the label base material 10 and the release liner 14, that is, in the adhesive layer 12.

Figure 2:
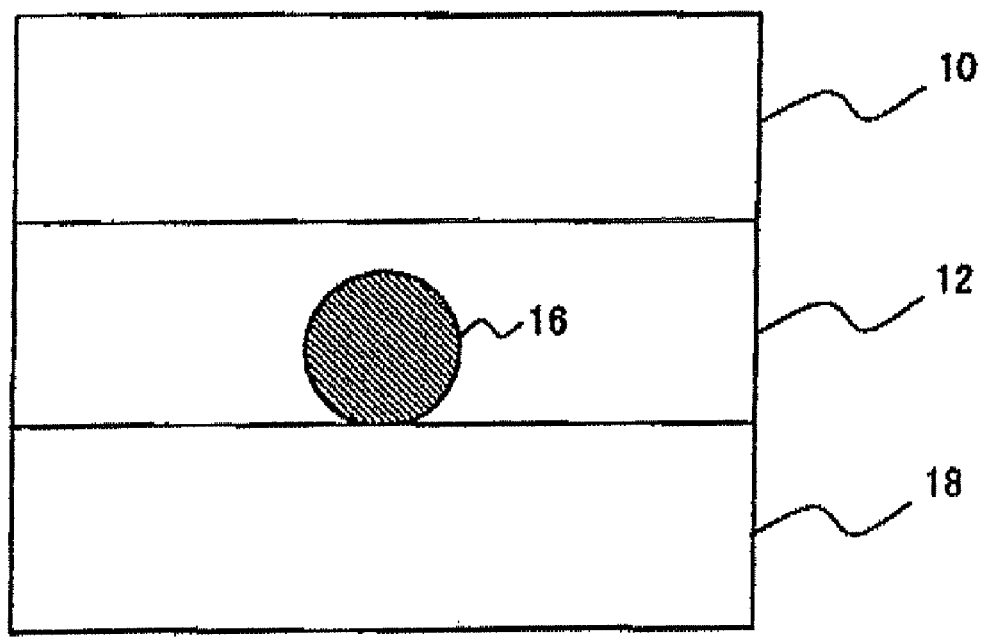
FIG. 2 is a schematic sectional diagram showing an example of the configuration of a scurrility subject pasted with the label sheet after a label base material is pasted on the security subject, in the exemplary embodiment of the invention.

For example, after a desired printing is performed on the major surface (the surface in opposite to the adhesive layer 12 side) of the label base material 10, the label base material 10 is exfoliated from the release liner 14 between the release liner 14 and the adhesive layer 12 and then the label sheet 1 is pasted on a subject to be pasted such as a security subject 18 by the adhesive layer 12 remained on the rear surface (the surface on the adhesive layer 12 side) of the label base material 10 and is used as shown in FIG. 2. In this case, since the adhesive layer 12 contains the wires 16, the wires 16 are pasted on the security subject 18 together with the label base material 10.

Figure 3:
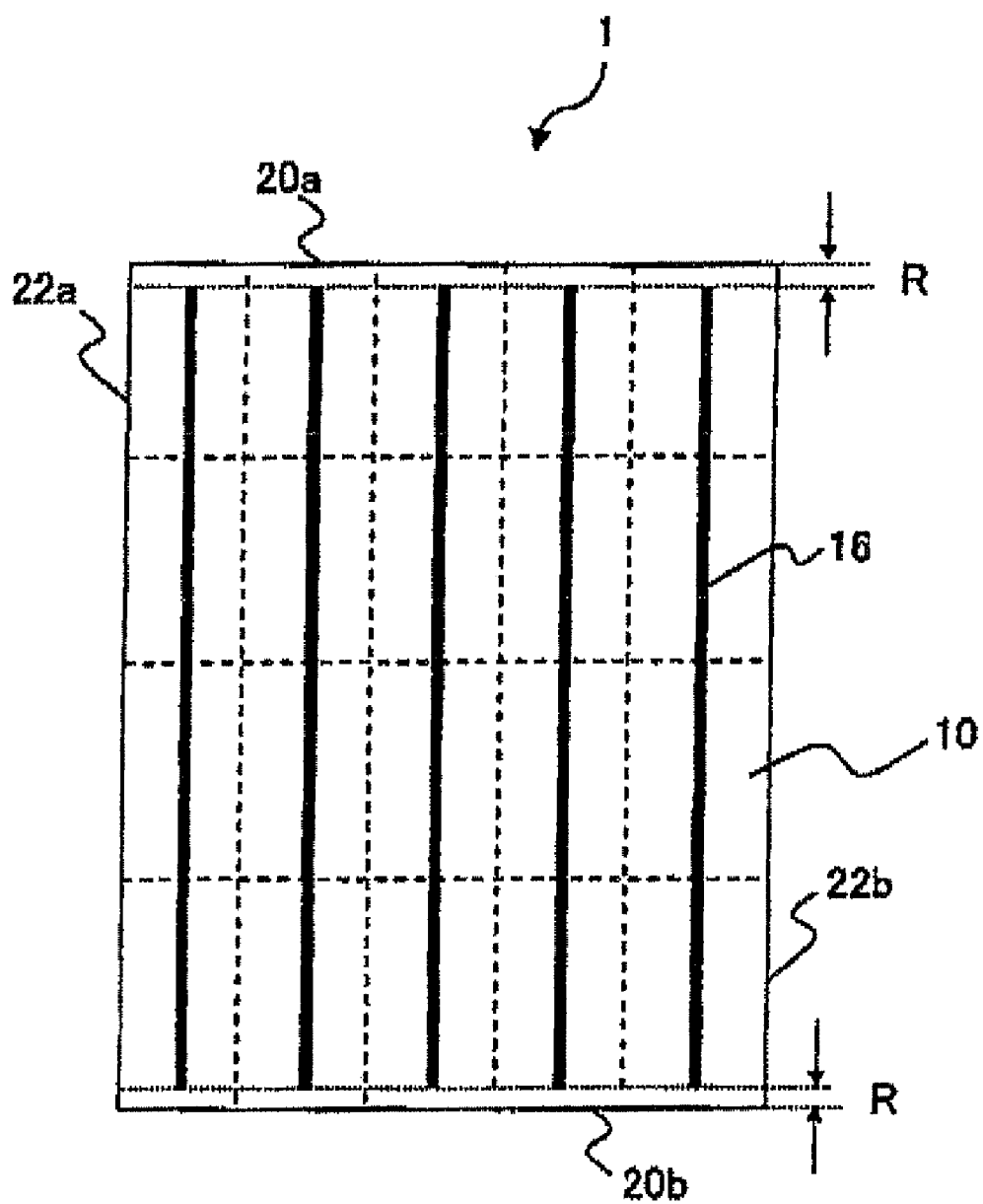
FIG. 3 is a schematic top view showing an example of the configuration of the label sheet according to the exemplary embodiment of the invention.

As shown in FIG. 3, in the label sheet 1, the wires 16 are respectively disposed on lines coupling at least one of two pairs of opposed sides (that is, a pair of long sides 22a, 22b and a pair of short sides 20a, 20b in the example shown in FIG. 3) of the label base material 10. In the example shown in FIG. 3, the wires 16 are disposed so as to be respectively placed on the straight lines coupling the opposed short sides 20a, 20b. In this case, each of the wires 16 is disposed in a manner that the both ends of the wire respectively locate at positions away from the corresponding short sides 20a, 20b by 0.2 mm or more. In other words, distances R to the end portions of each of the wires 16 from the short sides 20a, 20b of the pairs of the opposed sides of the label base material 10 are each 0.2 mm or more.

Figure 4:
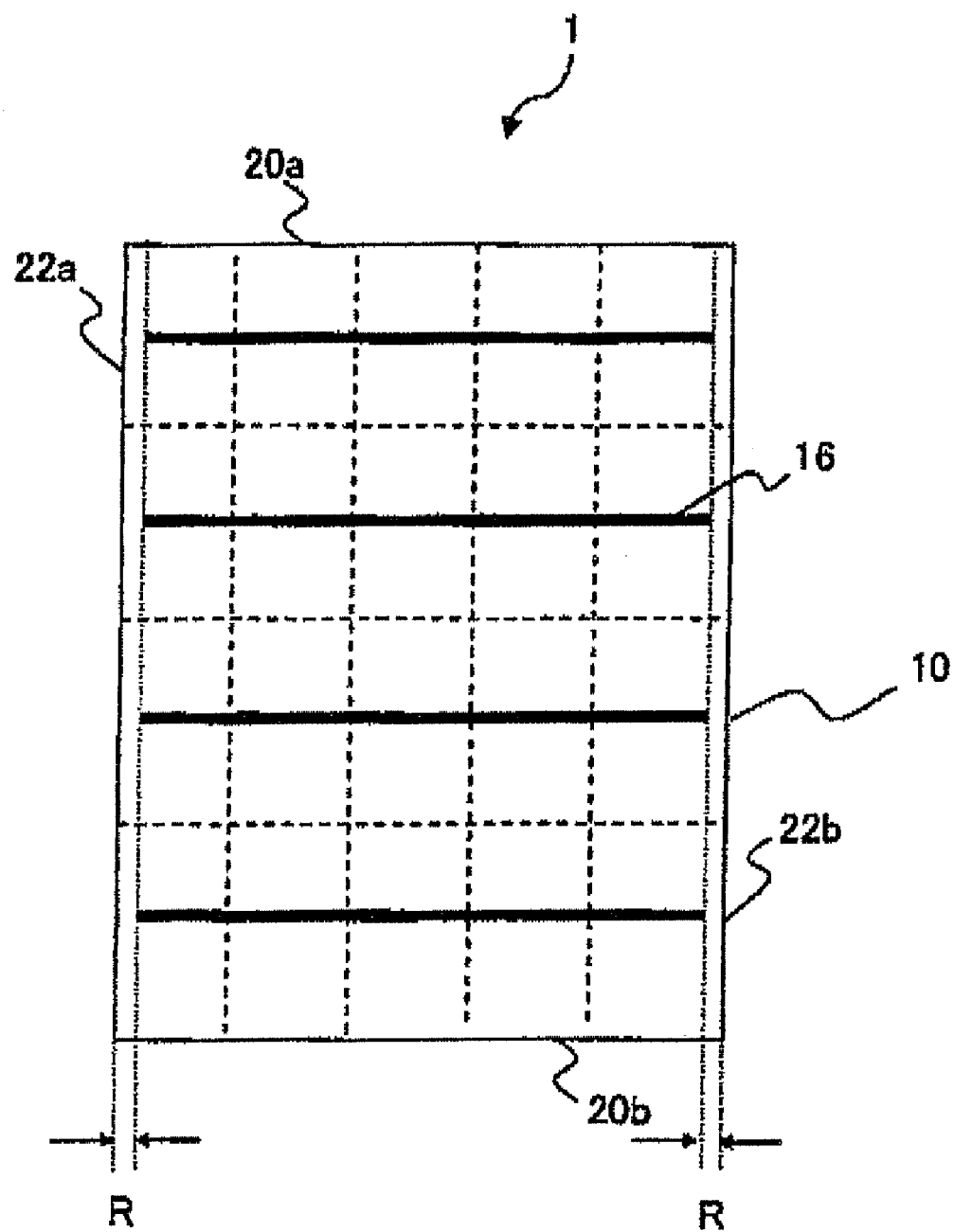
FIG. 4 is a schematic top view showing another example of the configuration of the label sheet according to the exemplary embodiment of the invention.

Alternatively, as shown in an example of FIG. 4, the wires 16 may be disposed so as to be respectively placed on straight lines coupling the opposed long sides 22a, 22b. In this case, each of the wires 16 is disposed in a manner that the both ends of the wire respectively locate at positions away from the corresponding long sides 22a, 22b by 0.2 mm or more. In other words, distances R to the end portions of each of the wires 16 from the long sides 22a, 22b are set to be each 0.2 mm or more.

For example, in the case of the label sheet for the image forming apparatus of the electrophotography type, due to the high temperature at the time of the fixing process of the electrophotography type, there may arise the change of a percentage of moisture content which results in the shrinkage of the label sheet 1 including the label base material 10 to be pointed. Since an amount of heat transmitted to the label base material 10 differs depending on the kind of the label base material 10 and the temperature and time of the fixing device (for example, the temperature after the fixing process is between 110 degrees centigrade or more and 120 degrees centigrade or less), and hence an amount of the shrinkage of the label sheet 1 may differ depending on the amount of heat. Each of the wires 16 is disposed in a manner that the both ends of the wire respectively locate at positions away from the corresponding opposed sides by 0.2 mm or more so that each of the wires 16 is not exposed from the end portions of the opposed sides even in the case where an amount of the shrinkage of the label base material 10 becomes maximum. Thus, each of the wires 16 is prevented from being exposed from the end portions of the label sheet 1 after the fixing process etc. in the image forming apparatus of the electrophotography type.

Although the shape of the label sheet 1 is not limited in particular, usually the shape is a quadrangle such as a rectangle having long sides and short sides.

Figure 5:
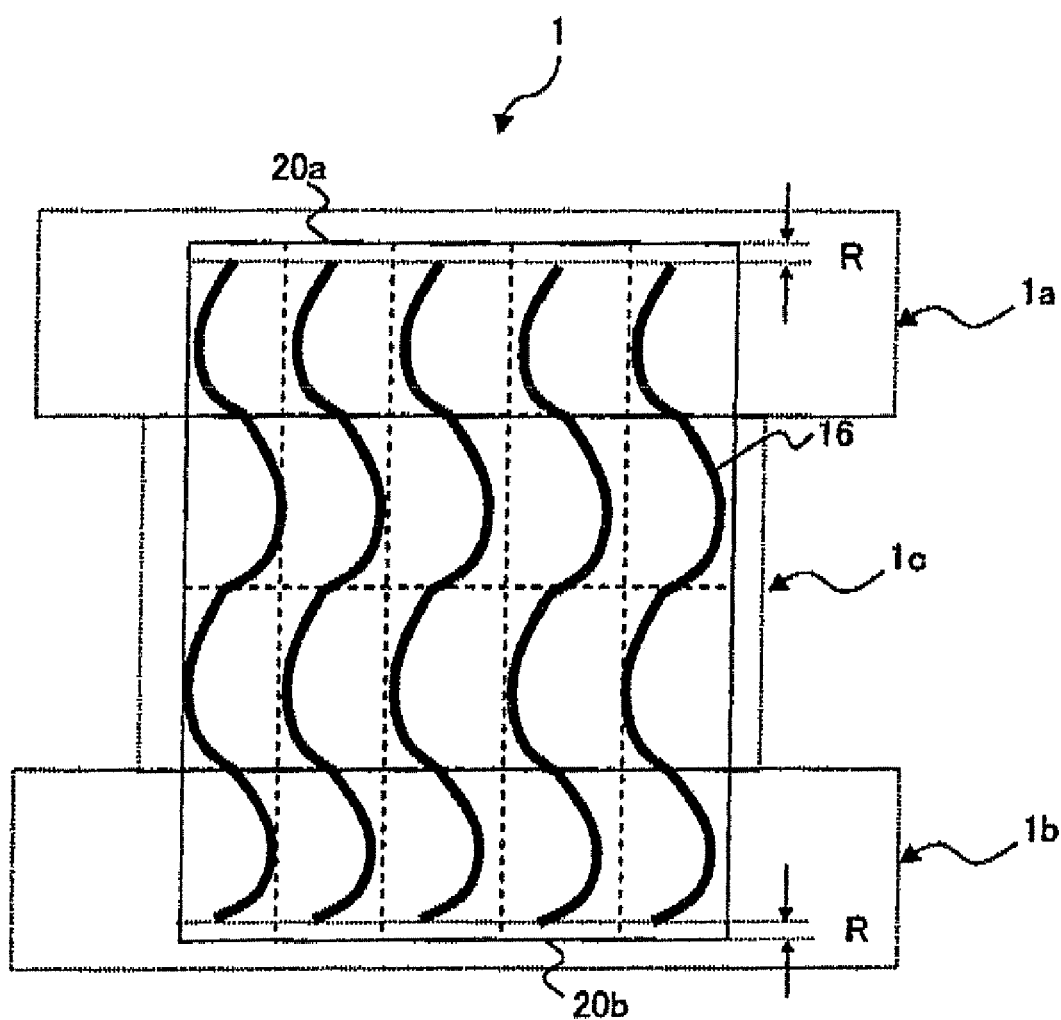
FIG. 5 is a schematic top view showing still another example of the configuration of the label sheet according to the exemplary embodiment of the invention.

The label sheet 1 according to the exemplary embodiment may be used in a manner that the configuration other than the release liner 14 of the single label sheet (that is, the configuration including the label base material 10, the adhesive layer 12 and the wires 16 in this exemplary embodiment) is cut into plural regions. Broken lines in FIGS. 3 to 5 represent cut lines. In the case of farming an image on the surface of the label base material 10, after forming images on the plural regions respectively, the configuration other than the release liner 14 is exfoliated from the release liner 14 at each of the plural regions and pasted an a subject to be pasted. In this case, although the wires 16 are respectively disposed on the lines coupling at least one of the two pairs of the opposed sides of the label base material 10, each of the wires may not be a single linear shape but may be cut on the way thereof so long as the length of the cut portion is 0.4 mm or less.

Although the shape of each of the wires 16 coupling at least one of the two pairs of the opposed sides of the label base material 10, that is, the shape of each of the lines on which the wires 16 are respectively disposed is not limited to a particular shape, the shape may be a curved shape such as a sine wave. FIGS. 3 and 4 show the examples of the arrangement of the wire 16 in the case where the wire 16 has the straight line shape. FIG. 5 shows an example of the arrangement of the wire 16 in the case where the wire 16 has the sine wave shape as the curved shape. In the example of FIG. 5, the wires 16 are respectively disposed so as to be placed on the sine-wave lines each coupling the opposed short sides 20a, 20b. In this case, each of the wires 16 is disposed in a manner that the both ends of the wire respectively locate at positions away from the corresponding short sides 20a, 20b by 0.2 mm or more. In other words, distances R to the end portions of each of the wires 16 from the short sides 20a, 20b are set to be each 0.2 mm or more. In the case where each of the wires 16 is a magnetic wire having the large Barkhausen effect, if each of the wires 16 is disposed in a manner that the both ends of the wire respectively locate at positions away from the corresponding both end portions of the label sheet 1 by 4 mm or more, there may arise a case that the peak value due to the large Barkhausen effect within an alternative magnetic field of label sheets 1a, 1b respectively containing the short sides 20a, 20b becomes too low with respect to a label sheet 1c containing no short sides 20a, 20b and hence a desired detection accuracy can not be obtained as to the label sheets 1a, 1b.

A wood free paper, a kraft paper, a recycled paper or a coated paper etc. may be used as the label base material 10. The basic weight of the label base material 10 may be in a range between 64 g/m$^2$ or more and 120 g/m$^2$ or less.

As the adhesive agent constituting the adhesive layer 12, various kinds of adhesive agent may be used such as acrylic, polyester, urethane, silicone, natural rubber or composite rubber binding material.

The adhesive layer 12 may be formed by coating the adhesive agent on the label base material 10 or the release liner 14.

The thickness of the adhesive layer 12 may be in a range between 2 μm or more and 40 μm or less, may be in a range between 2 μm or more and 30 μm or less and may be in a range between 5 μm or more and 20 μm or less.

As the release liner 14, a base sheet subjected to the impregnating processing or the surface processing by using remover may be used. A wood free paper, a kraft papers a polyethylene coated paper, a recycled paper or a coated paper etc. may be used as the base sheet. As the remover, the silicone-resin remover etc. may be used. The basic weight of the release liner 14 may be in a range between 64 g/m$^2$ or more and 120 g/m$^2$ or less. The impregnating processing or the surface processing of the remover with respect to the base sheet may be performed by the known method.

Figure 6A:
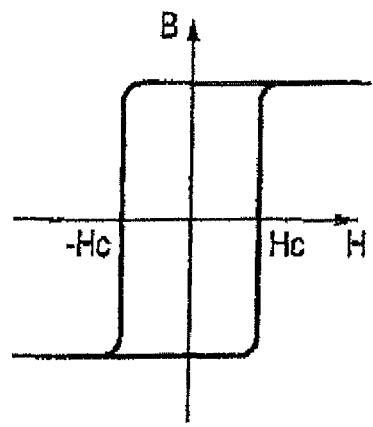
FIG. 6A, FIG. 6B and FIG. 6C are diagrams for explaining large Barkhausen effect.
Figure 6B:
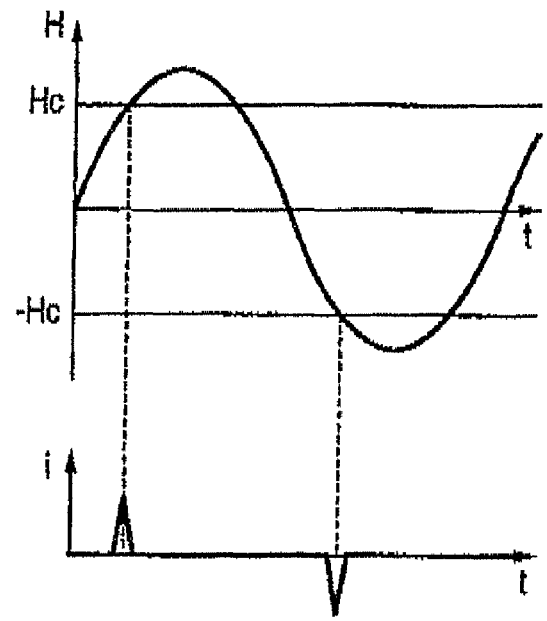
Figure 6C:
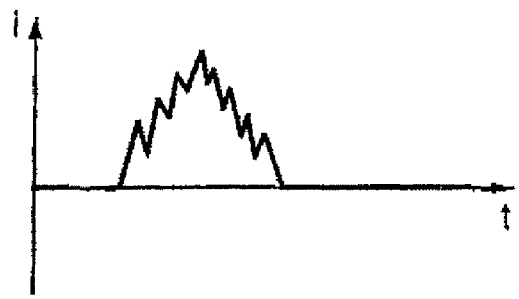

The wire 16 may be a magnetic wire having the large Barkhausen effect. The large Barkhausen effect will be explained in brief. FIG. 6A, FIG. 6B and FIG. 6C are diagrams for explaining the large Barkhausen effect. The large Barkhausen effect represents a phenomenon where abrupt flux reversal occurs in a case where material having the B-H (magnetic flux density—magnetic field) characteristics shown in FIG. 6A, that is, material having an almost rectangle hysteresis loop and a relatively small coercive force (Hc) such as amorphous magnetic material configured by Co—Fe—Ni—B—Si is placed within alternative magnetic field. Thus, after an AC current is flown into an excitation coil to thereby generate the alternative magnetic field, when the magnetic material is placed in the alternative magnetic fields a pulse current flows into a detection coil disposed near the magnetic material at the time of the flux reversal.

For example, when the alternative magnetic flux shown in the upper portion of FIG. 6B is generated by the excitation coil, a pulse current shown in the lower portion of FIG. 6B flows into the detection coil.

In this case, since an AC current induced by the alternative magnetic flux also flows as the current flowing into the detection coil, the pulse current is detected in a manner of being superimposed on the AC current. When the magnetic material composed by plural kinds of magnetic material is disposed in the alternative magnetic field, since plural pulse currents are superimposed, a current (having a peak value due to the large Barkhausen effect) as shown in FIG. 6C is detected.

The magnetic wire is generally configured by permanent magnet containing, as a major component, rare earth magnet such as neodymium (Nd)-iron (Fe)-boron (B), samarium (Sm)-cobalt (Co), Alnico magnet such as aluminum (Al)-nickel (Ni)-cobalt (Co), ferrite magnet such as barium (Ba) or strontium (Sr) and iron oxide ($Fe_2O_3$), soft magnetic material or oxide soft magnetic material etc. The magnetic wire may be configured by amorphous magnetic material such as Fe—Co—Si or Co—FeNi as the basis component.

The shape of the magnetic wire is not limited particularly so long as a longitudinal shape suitable for causing the large Barkhausen effect. However, since a predetermined length is required with respect to a sectional area in order to cause the large Barkhausen effect, the shape of the magnetic wire is a fiber-like shape such as a wire-like shape or a belt-like shape, and so the wire-like shape.

When the wire 16 may be the magnetic wire, the diameter of the wire may be 15 μm or more in order to cause the large Barkhausen effect as described above. Further, the maximum diameter is set suitably in accordance with the viscosity and the thickness of the adhesive layer 12 to such a degree preventing a phenomenon that the attachment strength to a subject to be pasted degrades due to the large size of the diameter of the wire 16.

The length of the magnetic wire may be 10 mm or more in order to cause the large Barkhausen effect. In the case where the configuration other than the release liner 14 of the label sheet is cut into plural regions and used, the length of the magnetic wire contained in each of the cut regions may be 10 mm or more. Although the maximum length of the magnetic wire is not limited particularly so long as the magnetic wire is not exposed from the label sheet 1 when the magnetic wire is contained within the label sheet 1, the maximum length of the magnetic wire may be 350 mm or less. Although each of the magnetic wires contained in the label sheet 1 may satisfy the aforesaid ranges of the diameter and the thickness thereof, when the values of the diameter and the thickness vary, the average values of the diameter and the thickness may satisfy the aforesaid ranges of the diameter and the thickness. Further, the surface of the magnetic wire may be subjected to the insulation process by insulation material such as ceramics or glass in order to increase the output of the pulse signal, for example.

Figure 7:
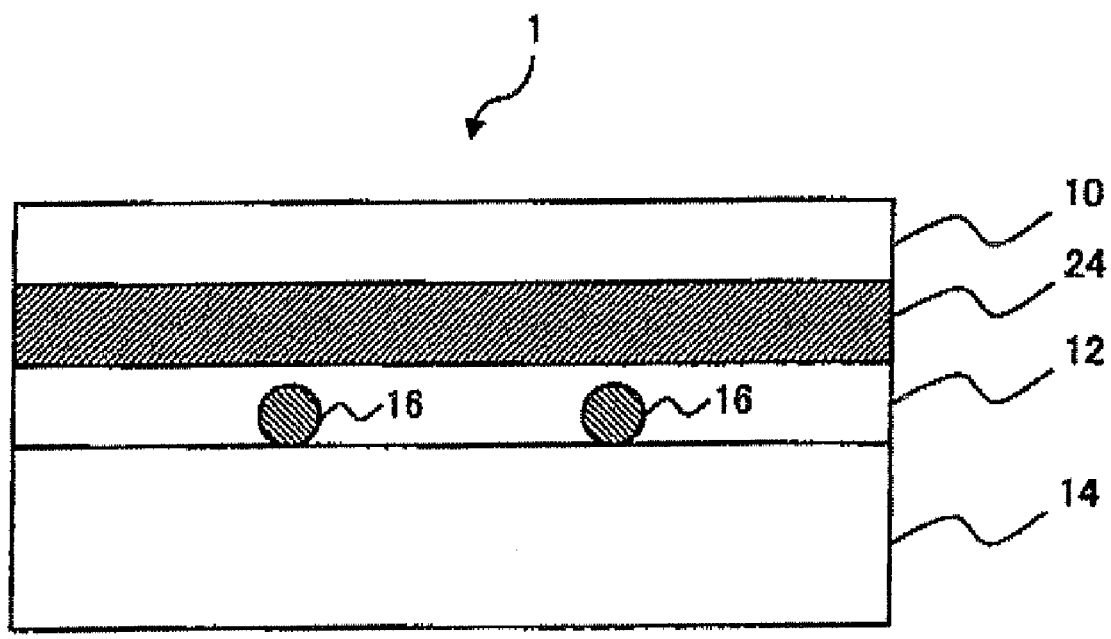
FIG. 7 is a schematic sectional diagram showing another example of the configuration of the label sheet according to the exemplary embodiment of the invention.

In this exemplary embodiment, as shown in FIG. 7, a shield layer 24 having shielding property may be provided between the label base material 10 and the adhesive layer 12. When the shield layer 24 is provided, the wires 16 remaining in a security subject can be shielded even if the label base material 10 is exfoliated from the security subject, for example. Alternatively, the adhesive layer 12 may be provided with the shielding property so that the adhesive layer 12 is an adhesive shield layer also acting as a shield layer.

The fabricating method of the shield layer 24 is not particularly limited so long as the shield layer has the shielding property. For example, the shield layer 24 may be formed by a method of coating opacifying agent between the label base material 10 and the adhesive layer 12, a method of printing the opacifying agent on the rear surface side (the adhesive layer 12 side) of the label base material 10, or a method of coating material formed by mixing pigment etc. into the adhesive agent between the label base material 10 and the adhesive layer 12. Alternatively, an adhesive shield layer acting as the shield layer and the shield layer may be configured by mixing pigment etc. into the adhesive agent constituting the adhesive layer 12 and coating the mixed material between the label base material 10 and the release liner 14.

The thickness of the shield layer 24 may be in a range between 2 μm or more and 40 μm or less, may be in a range between 2 μm or more and 30 μm or less and may be in a range between 5 μm or more and 20 μm or less.

<Detection Method and Diction Device for Detecting Security Subject Pasted with Label Sheet and Security Subject from which Label Sheet is Exfoliated>

In the case where the security subject after pasting the label base material 10 thereon (security subject pasted with the label sheet) contains the magnetic wires having the aforesaid large Barkhausen effect, when the security subject pasted with the label sheet is placed within the magnetic field, a detecting device detects an electric signal (for example, a pulse signal etc. as shown in FIGS. 6A to 6C) generated in the magnetic wires to thereby confirm the existence of the security subject pasted with the label sheet.

The configuration and the using mode of the detection device is not limited particularly so long as the aforesaid electric signal is detected in any way. However, in this exemplary embodiment, the detection device (it may be called "a detection gate" in this specification) may be configured by a pair of non-contact type detecting unit disposed fixedly at a predetermined position so as to have a width sufficient for passing a person therebetween.

In this detection gate, since a detection area is formed between the pair of detecting unit, it is possible to detect the existence of the security subject pasted with the label sheet when the security subject pasted with the label sheet passes through the detection gate. In the case of detecting the existence of the security subject pasted with the label sheet by using the detection gate, if the label sheets are pasted on articles which are desired to be inhibited from being taken out, for example, the detection gate can be utilized for the usage of preventing these articles from being illegally taken out. However, the label sheet in this exemplary embodiment is not limited to the aforesaid utilization.

The label sheets according to the exemplary embodiment may be used as printing label sheets, label sheets for an ink jet printer, label sheets for an image forming apparatus of an electrophotography type such as a laser printer or a copying machine.

EXAMPLES

Although the invention will be explained concretely in detail hereinafter with reference to examples and comparative examples, the invention is not limited to these examples.

Example 1

Binding material (acrylic binding material, manufactured by Toagosei Co., Ltd., HV-C9500) was coated on one surface of the label base material (C2 paper manufactured by Fuji Xerox Co., Ltd., basic weight 70 g/m$^2$, A4 size) by using a bar. On the other hand, the straight-line shaped magnetic wires (Fe base, diameter 35 μm were disposed on one surface of the release liner (EN80 white P, manufactured by Lintec Corp., basic weight 80 g/m$^2$, A4 size) so as to be respectively placed on the straight lines coupling the opposed short sides as shown in FIG. 3. Then, the label base material on which the binding material was coated was pasted on the release liner to thereby manufacture a label sheet having the label base material, the release liner and the adhesive layer formed between the label base material and the release liner. The distances R of the magnetic wire from the end portion of the short side were set to be 0.2 mm, 0.3 mm, 1 mm, 2 mm, 3 mm and 4 mm.

Example 2

The label sheet was fabricated in the in the similar manner as the example 1 except for that OK Prince manufactured by Oji Paper Co., Ltd. (basic weight 104 g/m², A4 size) was used as the label base material. The distances R of the magnetic wire from the end portion of the short side were set to be 0.2 mm, 0.3 mm, 1 mm, 2 mm, 3 mm and 4 mm.

Example 3

The label sheet was fabricated in the similar manner as the example 1 except for that 64EVS manufactured by Oji Paper Co., Ltd. (basic weight 64 g/m², A4 size) was used as the release liner. The distances R of the magnetic wire from the end portion of the short side were set to be 0.2 mm, 0.3 mm, 1 mm, 2 mm, 3 mm and 4 mm.

Example 4

The label sheet was fabricated in the similar manner as the example 1 except f or that OK Prince manufactured by Oji Paper Co., Ltd. (basic weight 104 g/m², A4 size) was used as the label base material, 64EVS manufactured by Oji Paper Co., Ltd. (basic weight 64 g/m², A4 size) was used as the release liner, and sine-wave shaped magnetic wires (Fe base, diameter 45 μm) were respectively disposed as the magnetic wires so as to be placed on the sine-wave lines each coupling the opposed short sides as shown in FIG. 5. The distances R of the magnetic wire from the end portion of the short side were set to be 0.2 mm, 0.3 mm, 1 mm, 2 mm, 3 mm and 4 mm.

Example 5

The label sheet was fabricated in the similar manner as the example 4 except for that C2 paper manufactured by Fuji Xerox Co., Ltd. (basic weight 70 g/m², A4 size) was used as the label base material and 50EVS manufactured by Oji Paper Co., Ltd. (basic weight 50 g/m², A4 size) was used as the release liner. The distances R of the magnetic wire from the end portion of the short side were set to be 0.2 mm, 0.3 mm, 1 mm, 2 mm, 3 mm and 4 mm.

Example 6

The label sheet was fabricated in the similar manner as the example 4 except for that 50EVS manufactured by Oji Paper Co., Ltd. (basic weight 50 g/m², A4 size) was used as the release liner. The distances R of the magnetic wire from the end portion of the short side were set to be 0.2 mm, 0.3 mm, 1 mm, 2 mm, 3 mm and 4 mm.

Comparative Example 1

The label sheet was fabricated in the similar manner as the example 3 except for that the distance R of the magnetic wire from the end portion of the short side was set to be 0.1 mm.
(Wire Exposure after Fixing)

An image was fixed on each of the label sheets of the examples 1 to 6 and the comparative example 1 in a thick paper mode by the fixing device of the image forming apparatus (DocuCentreColor 6550I manufactured by Fuji Xerox Co., Ltd.). The exposure of the magnetic wires from the end portions of the label sheet was evaluated by the following criterion by touching the end portions of the label sheets. The evaluation results was shown in a table 1.

○: exposure of wire was not felt by touching
Δ: although exposure of wire was felt by touching, not worrying
x: feel pain due to exposure of wire by touching

TABLE 1

| | wire shape | wire diameter [μm] | distance from end portion [mm] | label base material | release liner | wire exposure |
|---|---|---|---|---|---|---|
| example 1 | straight line | 35 | 0.2 | C2 | EN80 white P | Δ |
| | straight line | 35 | 0.3 | C2 | EN80 white P | ○ |
| | straight line | 35 | 1 | C2 | EN80 white P | ○ |
| | straight line | 35 | 2 | C2 | EN80 white P | ○ |
| | straight line | 35 | 3 | C2 | EN80 white P | ○ |
| | straight line | 35 | 4 | C2 | EN80 white P | ○ |
| example 2 | straight line | 35 | 0.2 | OK prince | EN80 white P | Δ |
| | straight line | 35 | 0.3 | OK prince | EN80 white P | ○ |
| | straight line | 35 | 1 | OK prince | EN80 white P | ○ |
| | straight line | 35 | 2 | OK prince | EN80 white P | ○ |
| | straight line | 35 | 3 | OK prince | EN80 white P | ○ |
| | straight line | 35 | 4 | OK prince | EN80 white P | ○ |
| example 3 | straight line | 35 | 0.2 | C2 | 64EVS | Δ |
| | straight line | 35 | 0.3 | C2 | 64EVS | ○ |
| | straight line | 35 | 1 | C2 | 64EVS | ○ |
| | straight line | 35 | 2 | C2 | 64EVS | ○ |
| | straight line | 35 | 3 | C2 | 64EVS | ○ |
| | straight line | 35 | 4 | C2 | 64EVS | ○ |
| example 4 | sine wave | 45 | 0.2 | OK prince | 64EVS | Δ |
| | sine wave | 45 | 0.3 | OK prince | 64EVS | ○ |
| | sine wave | 45 | 1 | OK prince | 64EVS | ○ |
| | sine wave | 45 | 2 | OK prince | 64EVS | ○ |
| | sine wave | 45 | 3 | OK prince | 64EVS | ○ |
| | sine wave | 45 | 4 | OK prince | 64EVS | ○ |
| example 5 | sine wave | 45 | 0.2 | C2 | 50EVS | Δ |
| | sine wave | 45 | 0.3 | C2 | 50EVS | ○ |
| | sine wave | 45 | 1 | C2 | 50EVS | ○ |
| | sine wave | 45 | 2 | C2 | 50EVS | ○ |
| | sine wave | 45 | 3 | C2 | 50EVS | ○ |
| | sine wave | 45 | 4 | C2 | 50EVS | ○ |
| example 6 | sine wave | 45 | 0.2 | OK prince | 50EVS | Δ |
| | sine wave | 45 | 0.3 | OK prince | 50EVS | ○ |
| | sine wave | 45 | 1 | OK prince | 50EVS | ○ |
| | sine wave | 45 | 2 | OK prince | 50EVS | ○ |
| | sine wave | 45 | 3 | OK prince | 50EVS | ○ |

TABLE 1-continued

| | wire shape [μm] | wire diameter [mm] | distance from end portion | label base material | release liner | wire exposure |
|---|---|---|---|---|---|---|
| | sine wave | 45 | 4 | OK prince | 50EVS | ○ |
| Comparative example 1 | straight line | 35 | 0.1 | C2 | 64EVS | x |

In each of the label sheets of the examples 1 to 6, there was no problem concerning the exposure of the wire after the fixing as to evaluation items. On the other hand, as to the label sheet of the comparative example, there arose a problem concerning the exposure of the wire from the end portions of the label sheet. In this manner, as to the label sheet in which the wires were mixed, the wires were prevented from being exposed from the end portions of the label sheet due to the shrinkage of the label sheet after the fixing process.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A label sheet, comprising:
   a label base material on which an image is formable;
   a release liner;
   an adhesive layer that is formed between the label base material and the release liner; and
   wires that are disposed between the label base material and the release liner so as to be respectively placed on lines coupling at least one of two pairs of opposed sides of the label base material in a manner that both ends of each of the wires respectively locate at positions away from the corresponding sides coupled by each of the lines by about 0.2 mm.

2. The label sheet according to claim 1,
   wherein each of the wires is a magnetic wire having large Barkhausen effect, the label base material, the adhesive layer and the wires are cut along lines intersecting the wires, and
   at least one of the both ends of each of the wires locates at a position away from one of the corresponding sides coupled by each of the lines by a length in a range between 0.2 mm or more and 4 mm or less.

3. The label sheet according to claim 1,
   wherein the label sheet has a square shape.

4. A label sheet for an electrophotographic process, the label sheet comprising:
   a label base material on which an image is formable;
   a release liner;
   an adhesive layer that is formed between the label base material and the release liner; and
   wires that are disposed between the label base material and the release liner so as to be respectively placed on lines coupling at least one of two pairs of opposed sides of the label base material in a manner that both ends of each of the wires respectively locate at positions away from the corresponding sides coupled by each of the lines by about 0.2 mm.

5. The label sheet according to claim 4,
   wherein the label sheet has a square shape.

* * * * *